Figure 1:
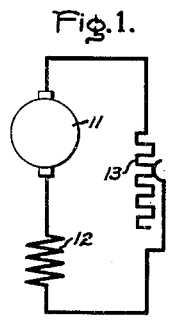

July 7, 1936.                M. J. P. ROYER                2,046,970
CONTROL SYSTEM
Filed July 3, 1935                          2 Sheets-Sheet 1

Inventor:
Marcel J. P. Royer,
by Harry E. Dunham
His Attorney.

July 7, 1936.  M. J. P. ROYER  2,046,970

CONTROL SYSTEM

Filed July 3, 1935   2 Sheets-Sheet 2

Inventor:
Marcel J. P. Royer,
by Harry E. Dunham
His Attorney.

Patented July 7, 1936

2,046,970

UNITED STATES PATENT OFFICE 2,046,970

CONTROL SYSTEM

Marcel J. P. Royer, Villeneuve-le-Roi, France, assignor to General Electric Company, a corporation of New York Application July 3, 1935, Serial No. 29,757
In France July 11, 1934

13 Claims. (Cl. 172—179)

My invention relates to control systems, more particularly to the control of the electrical braking of driving motors, and has for an object the provision of a simple, inexpensive and reliable braking system which provides a uniform braking effort over a wide range of speed.

In view of the higher operating speeds of electrical vehicles, it is advisable to provide them with rheostatic braking systems which make it possible not only to accomplish braking on an incline but also to produce a substantial braking effort until the vehicle is brought to a standstill. Preferably the braking effort is maintained near a permissible maximum which is determined by the adhesion normally applying to unsanded wet rails. Accordingly, the braking must be so established and regulated that the current density or the braking effort of the traction motors which operate as generators will vary in accordance with the changing adhesion and the speed of the vehicle, so as to establish a slowing-down period of minimum duration and to achieve the complete stopping of the vehicle in the minimum braking distance without risking at any time slippage of the wheels with respect to the rails.

It will be seen that these operating conditions can best be met by automatic equipments; for the manual control for eliminating the braking resistances would tend to lead either to a poor utilization of the adhesion, or to cause, at certain speeds, momentary slipping of a character likely to be injurious to the traction motors.

In accordance with my invention in one form thereof, I provide automatic braking equipments which meet the general conditions described above and which use direct current motors that operate as series generators to supply current through a variable resistance, with or without shunting of their field windings. Although my invention is particularly applicable to traction equipment, it can be also applied to all equipments wherein direct current motors are used for rheostatic braking, such as equipments for controlling hoisting machinery. More specifically, I provide automatic regulation of the braking effect by means of one or more relays operating in response to motor current or voltage, or both, the relays functioning to limit the voltage and braking effort to a permissible value depending upon the speed of the motors operating as generators. Accordingly, the braking effect will never go beyond the value at which, according to the speed, slipping might occur. I also provide for field forcing or for temporary separate excitation of the motors to increase the rate of rise of the motor magnetism so as to minimize the time required for the motors to develop their maximum braking effort.

Other improvements will appear in the course of the following description. It will be noted that the various improvements may, depending upon individual cases, be utilized separately or simultaneously, and according to any kind of combination with each other or with other arrangements, on the same equipments.

Figure 2:
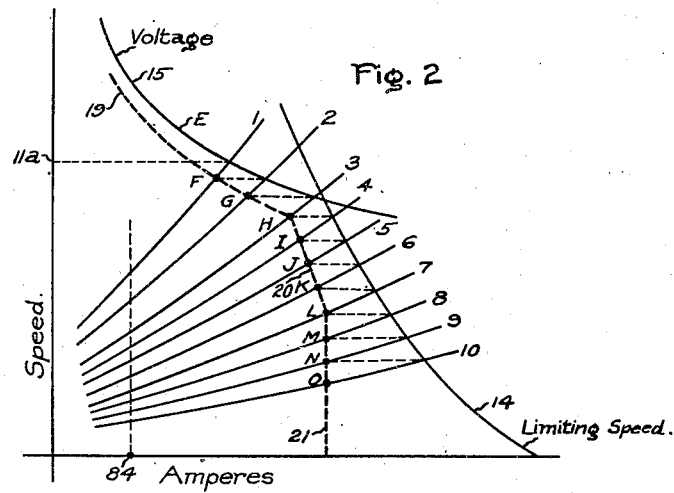
Figure 3:
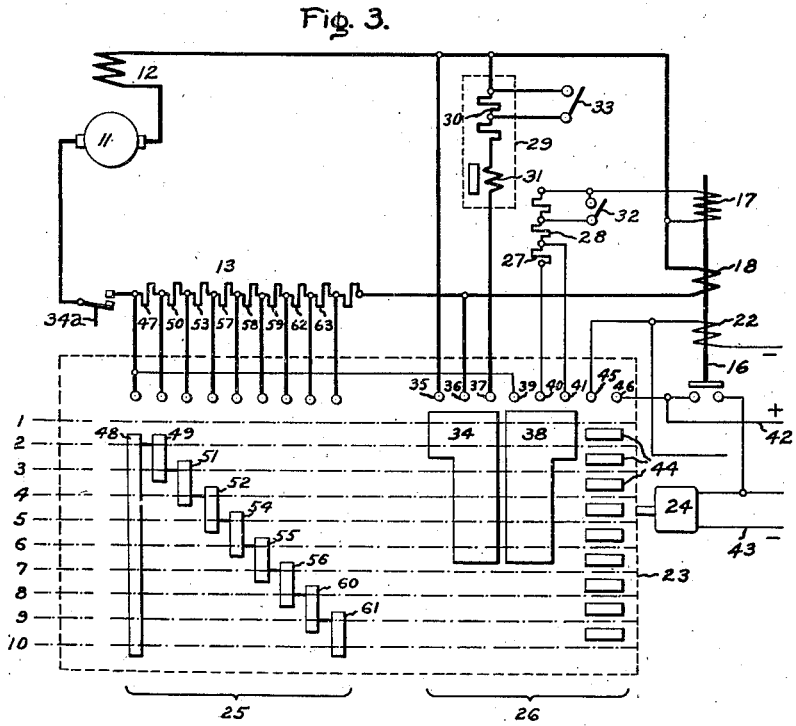

For a more complete understanding of the invention reference should now be had to the attached drawings, wherein I have shown in Fig. 1 a single motor connected in series with a braking resistance; Fig. 2 illustrates curves explanatory of the invention; Fig. 3 diagrammatically illustrates a control system embodying my invention; and Figs. 4–6, inclusive, illustrate diagrammatically modified forms of my invention.

For the purpose of simplifying the explanation and diagrams, I have illustrated my invention as applied to a single motor. It is to be understood, however, that my invention is applicable to equipments comprising several motors that operate as generators according to various coupling methods, for example, series, series-parallel, and parallel. The regulation of the braking resistances and of the field excitation of the various motors can be obtained by any one of the well-known systems, for instance, by means of a direct or an indirect control involving contactors such as individual contactors with control drums, cam-type contactors with servo-motors operated either by oil or compressed air or electromagnetically.

Referring to the drawings, I have shown my invention in its simplest form as applied to a motor 11 provided with a series field winding 12 connected in closed circuit relation with the motor armature and a variable braking resistance 13. For convenience, it will be assumed that the braking resistance 13 is varied in ten steps although the number of steps can be increased or decreased as may be desired.

Referring to Fig. 2, it will be observed that the characteristic curves for the electric braking operations are plotted with speed as ordinates and the motor current in amperes as abscissae. The curves numbered 1 to 10, inclusive, illustrate the motor characteristics for the corresponding ten changes in the resistance 13. The curve 14 represents the limiting speed as a function of the current output, i. e., the speed which must not be exceeded in order to avoid slipping of the wheels. The curve 15 represents the limiting voltage which must not be exceeded, so that the motor 11 may operate as a generator under good commutating conditions. In view of the limitations of voltage and speed, the resistance 13 must be varied so that the limits of voltage and speed will not be exceeded. Consequently, the resistance may be varied as indicated by the broken line connecting the points F to O, inclusive.

In accordance with the present invention, this transfer or change-over from one value of resistance to another is accomplished automatically by a relay 16 (Fig. 3) provided with a voltage winding 17 which receives its current from the terminals of the braking resistance 13, and a current winding 18 through which the braking current flows.

In the most general case, this relay 16 has three distinct operating zones. The first zone corresponds to a mode of operation such that the transfer points F and G are on a curve 19, where the voltage is practically constant. This voltage must be so proportioned that at the moment of the peak the permissible voltage for the motors is not exceeded. Accordingly, the relay in this zone is responsive only to voltage, the current winding 18 being disconnected or short circuited.

The second zone corresponds to an operation such that the transfer points, H, I, J, and K, in this case, from one notch to the next, are on a curve 20, so that $$k_1 V + k_2 I = \text{constant}$$

$k_1$ and $k_2$ being constant coefficients and V and I being respectively the voltage and current corresponding to each one of the points, H, I, J, and K. In this zone the relay is responsive both to voltage and to current.

The third zone corresponds to a mode of operation such that the transfer points, L, M, N, and O, are on a straight line 21, representing constant current. The relay 16 is now responsive only to current, the voltage winding being disconnected or short circuited.

The first operating zone is governed by the limiting voltage which may be allowed at the terminals of the motors operating as generators. The second and the third operating zones are governed by the limit adhesion.

In the practical applications, it may happen that only one or two of the above defined zones need be utilized and the number of notches may be increased or decreased as may be desired.

Referring now to Fig. 3, it will be observed that the relay 16 is also provided with an auxiliary winding 22 which, as will be explained more fully hereinafter, assists in the operation of a main controller 23 in one direction or the other by means of a motor 24. The main controller comprises a main drum 25 for controlling the value of the braking resistance and an auxiliary drum 26 which regulates the relay 16 according to the zone or operating condition of the motor 11 and insures the energization of the relay 16 between each of the regular notches to thereby de-energize the motor 24 and reset the relay 16 in its open position. It will be understood that the controller 23 is provided with suitable means, such as the usual mechanical notching device (not shown) for positioning the controller in each position or notch, this notching device operating to continue the movement of the controller to the next position after the motor 24 has been de-energized. In other words, the motor 24 moves the controller far enough to set up a biasing force which continues its movement to the next position.

In order to adjust the energization of the voltage coil 17, regulating resistances 27 and 28 are connected in series circuit with it. For the same purpose, an inductive shunt 29 provided with resistance 30 and reactance 31 is provided for the series coil 18. The resistances 27 and 28 and the shunt 29 may be adjusted respectively by means of switches 32 and 33. The contacts 10 of a braking contactor 34a in the braking circuit are shown open.

In explaining the operation of my invention as illustrated in Fig. 3, it will be assumed that the braking diagram is identical with that of Fig. 2 and that the curves marked 1—10, inclusive, of Fig. 2 illustrate the motor characteristics for corresponding positions 1—10, inclusive, of the controller 23.

It will be further assumed that the main controller has moved to its first position and that the motor 11 rotating at a speed indicated in Fig. 2 by the reference numeral 11a is acting as a generator to send current through the braking resistance 13. In the first position, a controller segment 34 engages the contact fingers 35, 36, and 37 of the auxiliary drum 26 to short circuit the relay current coil 18 while a controller segment 38 engages the contact fingers 39, 40, and 41 to connect the voltage coil 17 through a predetermined resistance 28 across the braking resistance 13. Preferably the auxiliary coil 22 is momentarily energized by appropriate means (not shown) at the time the contactor 34a is closed to open the relay 16 so that thereafter the voltage drop across the resistor 13 is effective in causing sufficient current to flow through the relay voltage coil to maintain the relay 16 in the open circuit position so long as the motor voltage is above a predetermined value.

For the first position of the controller the initial value of the braking resistance 13 is selected so that the voltage of the motor 11 will be maintained within predetermined limits, as is illustrated by the curve 15, i. e., a voltage such that the motor 11 may operate as a generator under good commutating conditions. During this initial braking the commutating conditions are to a large degree dependent upon the motor voltage and, therefore, the relay is responsive during this first period or zone of operation only to the motor voltage.

Continuing with the operation of my invention, the braking effort produced by the motor decreases the speed along curve 1 with a resultant drop in motor voltage. The relay 16 in response to a predetermined decreased voltage operates at the point F, curve 1, to close its contacts and to energize the controller driving motor 24. This circuit may be traced from a positive supply line 42, through the contacts of relay 16, the motor 24, and to a negative supply line 43. The motor 24 thereupon operates the controller 23 from notch 1 towards notch 2. As the controller reaches a position intermediate notches 1 and 2, the first of the series of controller segments 44 engages contacts 45 and 46 to complete an energizing circuit for the auxiliary relay coil 22 which immediately operates to reset the relay 16 to the open circuit position thereby de-energizing the motor 24, the controller 23 coming to a standstill in its second position to short circuit the first section 47 of the resistance 13 through the controller segments 48 and 49. The current increases in accordance with the broken line extending from point F to the voltage limiting curve 15. The braking effort then slows down the motor in accordance with curve 2. At the point G the relay 16 again closes its contacts to energize the motor 24 in a direction to move the controller towards its third position, the second controller segment 44 again energizing the auxiliary coil to bring the controller to a standstill in its third position. Between the second and third positions the controller segments 34 and 38 have been operating to a position to disengage the stationary contact fingers 35 and 41. The disengagement of the contact 35 removes the short circuit from the relay current coil 18, the inductive shunt 30 being connected in parallel with the current coil. The increased attractive force on the relay 16, due to the energization of the current coil 18, is partially compensated for by the increase in the resistance included in circuit with the relay voltage coil 17 due to disengagement of the contact segment 41 from the controller segment 38.

Due to the exclusion of the second section 50 of the resistor 13 by the controller segments 48 and 51, the current of the motors increases in accordance with the broken line extending from the point G of curve 19 to the voltage limiting curve 15. As the increased braking effort slows down the motor in accordance with curve 3, the operation of the relay 16 is effected both by the voltage and current of the motor. In this case, the braking effort is limited by the adhesion of the wheels of the vehicle and the relay 16 is therefore adjusted so that the combined effect of the voltage and current coils 17 and 18 will retain the controller in the third position until the braking effort has decreased to the point H of curve 3. The relay 16 again closes its contacts and the motor 24 operates the controller to its fourth position to exclude, by means of controller segments 48 and 52, the third resistance sections 53. The motor current is correspondingly increased as indicated by the dotted line extending from the point H to the speed limiting curve 14. It will be noted that the relay is now functioning in the second zone of operation with the speed as the limiting factor. Consequently, the motor braking effort never exceeds a predetermined value which is determined by the variation of the adhesion with speed of the vehicle.

The relay 16, as described above, then operates in accordance with the speed and voltage of the motor to cause the controller to notch through the fourth to the seventh positions, inclusive, at the points I, J, K, and L of the curves 4—7, inclusive. The controller segments 54, 55, and 56 short circuit additional sections 57, 58, and 59 of the resistance 13. Between the sixth and seventh positions the controller segments 34 and 38 disengage their respective contacts 35 to 37 and 39 to 41, inclusive, the result of which is to disconnect the voltage coil 17 from the circuit and to disconnect the inductive shunt 30 from the current coil 18. The shunt is disconnected in this case in order to compensate for the disconnection of the voltage coil 17. The relay 16, is, therefore, solely dependent upon the current of the motor 11 and when this current decreases to the point L on curve 7 the relay again operates to cause the controller to move to position 8 and thereafter to operate in the same manner under the control of the relay 16 to positions 9 and 10. The controller segments 60 and 61 co-operate with the controller segment 48 to short circuit additional resistor sections 62 and 63. With the controller in the last position the braking occurs in accordance with curve 10 of Fig. 2.

Figure 4:
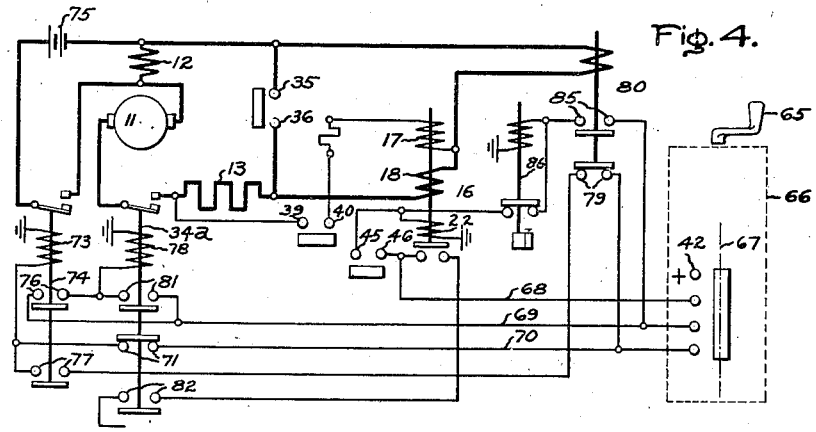

Referring to Fig. 4, I have shown a modified form of my invention wherein a separate source of excitation is applied to the field winding 12 of the motor 11 to cause a rapid rise in the field excitation and thereby accomplish in the minimum amount of time the rise of the braking current. The relay 16 in this case is connected so that it operates within the second control zone indicated by the broken line 20 of Fig. 2, although, if desired, this relay may operate to control the current in accordance with any one or all of the zones described above. As described above, the contacts 35 and 36 initially short circuit the current coil 18, the contacts 39 and 40 during the first part of the braking connect the voltage coil 17 across the braking resistance 13 and the contacts 45 and 46 co-operate with the positioning segments 44 to insure that the main braking controller 23 is brought to a standstill in a given one of its positions 1 to 10, inclusive.

In order to initiate the braking operations of the motor 11, an operating handle 65 of a master controller 66, only a part of which is shown in Fig. 4, is operated to a braking position, denoted by the broken line 67, to supply voltage from the positive source of supply 42 to conductors 68, 69, and 70. Since the braking contactor 34a is in its open position with its interlock contacts 71 closed, an energizing circuit is completed by conductor 70 for the operating coil 73 of a contactor 74. The contactor 74 thereupon closes to energize the motor field winding 12 from a local source of supply indicated by a battery 75. At the same time, the interlock contacts 76 and 77 of the contactor 74 close the contacts 76, energizing through the conductor 69 an operating coil 78 of the braking contactor 34a while the contacts 77 complete a holding circuit for the operating coil 73 which may be traced from the positive source of supply 42, conductor 70, contacts 79 of a motor current responsive relay 80, interlock contacts 77, and coil 73 to the ground connection indicating the negative source of supply. The closure of the contactor 34a completes the braking circuit of motor 11 through the braking resistance 13. At the same time, it closes its interlock contacts 81 and 82 and opens its contacts 71. The contacts 81 complete a holding circuit for the contactor operating coil 78 while the closure of the contacts 82 completes an energizing circuit to operate the controller driving motor 24 only to its first notch or position. At the instant the contactor 74 connects the battery 75 to the field winding 12 the field excitation of the motor rapidly increases. The excitation of the field winding 12 is further increased due to the flow of braking current through the braking circuit established by the closure of the contactor 34a. As soon as the braking current reaches a predetermined value, for example, the value indicated at 84 of Fig. 2, the current relay 80 operates to open its contacts 79 and to close its contacts 85, the opening of the contacts of course interrupting the holding circuit for the contactor 74, which thereupon operates to its open circuit position. Since the energization of this contactor is dependent upon the braking contactor 34a being in its deenergized position, it will be observed that the contactor 74 cannot again be reclosed until after the braking has ceased or until the contactor 34a has been de-energized.

Continuing with the operation of my invention, the closure of the contacts 85 completes an energizing circuit for the operating coil of the time delay relay 86 and an energizing circuit for the normally closed contacts of the time delay relay for the auxiliary coil 22 of the relay 16. Therefore, the relay 16 is retained in its open circuit position to prevent operation of the controller driving motor 24. After a predetermined time interval, which is selected so that the motor current will rise to a value such that the coils 17 and 18 will take over the control of the main controller, the normally closed contacts of the time delay relay open to interrupt the energizing circuit of the auxiliary coil 22. The relay 16 then operates to control automatically the braking of the motor 11 in the manner already described in connection with Fig. 3. Since the relay 80 operates on a much lower value of current than the relay 16, it will be apparent that it no longer effects the operation during the subsequent braking period.

Figure 5:
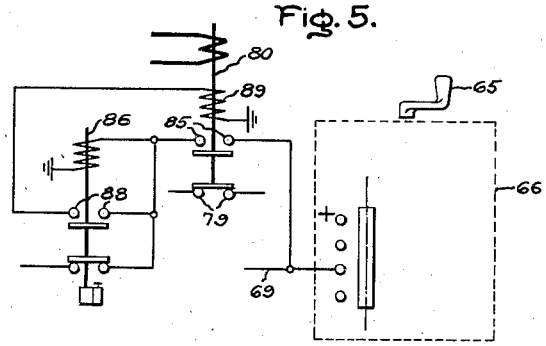

In case it is desired to lock the relay 80 in its energized position, a time delay relay 86, Fig. 5, may be provided with a pair of normally open contacts 88 arranged to energize an auxiliary coil 89 provided on the relay 80. Obviously, so long as the time delay relay 86 is energized, an energizing circuit is completed for the auxiliary coil 89 which retains the relay 80 in its open circuit position irrespective of the current flowing through its current coil.

Figure 6:
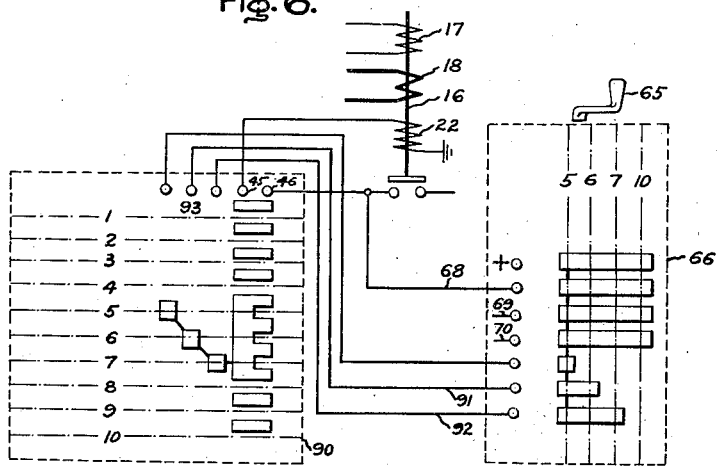

In mountainous districts it is frequently desirable to control the electrical braking so that the motors exert a substantially constant braking effort to hold the speed of the train or vehicle within predetermined limits as it travels down grade. A modified form of my invention to take care of these conditions is shown in Fig. 6 wherein a main controller 90 is provided with modified segments for certain of the controller positions; i. e., notches or positions 5, 6, and 7. The braking operation may be initiated by the handle 65 of the master controller 66, the relays 16 and 80, not shown in this figure, operating in the manner described in connection with Fig. 4.

As soon as the main controller 90 is operated to position 6, a contact finger 93 is connected by the controller segments to the contact finger 45 to complete an energizing circuit for the auxiliary coil 22 of the relay 16. This circuit may be traced from the positive source of supply, through control segments of the master controller 66, conductor 91, controller finger 93, segments of controller 90, contact finger 45, and through the coil 22 to the ground connection indicating the negative side of the source of supply. The coil 22 thereupon acts to lock the relay 16 in its open circuit position to prevent the main controller from advancing beyond position 6. If the master controller 66 is now operated to position 7, the circuit traced from conductor 91 will be interrupted and a new circuit established through conductor 92 which will complete an energizing circuit for the auxiliary coil 22 after the main controller 90 has been operated by its driving motor to its seventh position.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In combination, an electric motor provided with a series field winding connected in closed series circuit relation with the motor armature and a braking resistance, of means responsive in succession to the motor voltage, the motor voltage and current, and to the motor current for excluding said resistance from said series circuit.

2. In combination, an electric motor provided with a series field winding connected in closed series circuit relation with the motor armature and a braking resistance, of means responsive in succession to the motor voltage, the motor voltage and current, and to the motor current for excluding said resistance from said series circuit at a rate such that the braking effort of said motor will vary in accordance with a variable condition of operation.

3. In combination, an electric motor provided with a series field winding connected in closed series circuit relation with the motor armature and a braking resistance, the permissible maximum braking effort being dependent upon a variable condition of operation, of means responsive in succession to the motor voltage, the motor voltage and current, and to the motor current for controlling said resistance and said braking effort substantially in accordance with said variable condition of operation.

4. An electric motor provided with a series field winding, a braking resistance, means connecting said motor and field winding in series circuit relation with said braking resistance, the maximum permissible braking effort being determined by the adhesion, said adhesion varying with the speed of said motor, means responsive to the motor voltage for decreasing to a predetermined value said braking resistance, said means being thereafter responsive both to motor voltage and current for further decreasing said braking resistance to a second predetermined minimum value, said means thereafter being responsive to motor current only for further decreasing said resistance.

5. The combination with an electric motor arranged to drive a vehicle and a braking resistance for the motor, of connecting means for connecting said braking resistance in series circuit relation with said motor, the initial value of said resistance being selected to limit to a predetermined maximum the voltage generated by said motor when operating at a predetermined maximum speed, control means responsive to said motor voltage for excluding a portion of said resistance from said circuit, means automatically operable to render said control means responsive both to motor voltage and motor current for excluding a second portion of said resistance, and means automatically operable to render said control means responsive only to said motor current for excluding the remaining portion of said resistance from said series circuit.

6. Means for controlling the braking effort of a series motor connected in series circuit relation with a braking resistor, comprising a controller operable through a plurality of positions to exclude in each position a portion of said resistor from said series circuit, a relay provided with coils respectively responsive to the motor voltage and the motor current for controlling the advance of said controller through said positions, connecting means operable by said controller when in a predetermined number of its initial positions for rendering said current coil ineffective, said relay then being responsive only to said motor voltage, said controller when in a predetermined number of its intermediate positions rendering said current coil effective, said relay then being responsive both to said motor voltage and current, said controller during said remaining positions de-energizing said voltage coil.

7. A braking system for an electric motor provided with a series field winding, a braking resistance, control means for connecting said braking resistance in closed series circuit relation with said motor and its field winding, a control device for completing an energizing circuit for said series field winding to cause a rapid rise of field excitation, interlocking control circuits between said control means and said control device for preventing operation of said control means until after said control device has completed said energizing circuit, and means responsive to a predetermined value of braking current for causing operation of said control device to interrupt said energizing circuit.

8. A braking system for an electric motor provided with a series field winding, a braking resistance, control means for connecting said braking resistance in closed series circuit relation with said motor and its field winding, a control device for completing an energizing circuit for said series field winding to cause a rapid rise of field excitation, interlocking control circuits between said control means and said circuit controlling device for preventing operation of said control means until after said control device has completed said energizing circuit, means responsive to a predetermined value of braking current for causing operation of said control device to interrupt said energizing circuit, and means thereafter responsive in succession to said motor voltage, said motor voltage and said motor current, and only to said motor current for excluding at a predetermined rate said resistance from said series circuit.

9. The method of controlling the braking effort of an electric motor within limits fixed by the adhesion which consists in initially controlling the braking effort in accordance with the motor voltage, then controlling the braking effort in accordance with both the motor voltage and the motor current, and finally controlling the braking effort in accordance with the motor current only.

10. The method of controlling the braking effort of an electric motor arranged to drive a vehicle provided with wheels, which consists in initially controlling the braking effort in accordance with the motor voltage and after a predetermined reduction in said motor voltage controlling the braking effort in accordance with both the motor voltage and current, and finally controlling the braking effort in accordance with the motor current only, the value of said braking effort being at all times maintained at a value determined by the adhesion of the wheels of the vehicle.

11. The method of controlling the braking effort of an electric motor provided with a braking resistance and arranged to drive a vehicle provided with wheels, which consists in decreasing the braking resistance to a predetermined value of the braking resistance in accordance with the decrease in motor voltage, thereafter decreasing the value of the braking resistance as a function of both the motor voltage and current to approximate closely the permissible braking effort as determined by the changing adhesion of the wheels, and finally decreasing said resistance as function only of the motor current more closely to maintain the braking effort equal to the permissible effort determined by the adhesion.

12. In combination, a motor provided with a series field winding, a braking resistance, a relay provided with a current responsive coil, connecting means forming a braking circuit including said motor, its field winding, said current coil and said braking resistance, a controller operable through a plurality of positions to exclude progressively said braking resistance from said braking circuit, a voltage coil for said relay responsive to the voltage drop across said braking resistance, an inductive shunt for said current coil, a calibrating resistance normally connected in series circuit relation with said voltage coil, driving means for said controller arranged to be energized by operation of said relay, means operable by said controller when it is operating through a predetermined number of its initial positions for short circuiting said current coil and for short circuiting a predetermined amount of said calibrating resistance whereby the advance of said controller through said initial positions is under the control of said voltage coil, said means interrupting said short circuit of said current coil when said controller is operating through a predetermined number of its intermediate positions, said means remaining effective to connect said inductive shunt in parallel circuit relation with said current coil whereby the advance of said controller through said intermediate position is under the joint control of said voltage and current coils, said means when said controller is operating through the remainder of its positions rendering said voltage coil ineffective and disconnecting said shunt from said current coil whereby said braking effort is finally determined solely by said motor current.

13. In combination, a motor provided with a series field winding, a braking resistance, a relay provided with a current responsive coil, connecting means forming a braking circuit including said motor, its field winding, said current coil and said braking resistance, a controller operable through a plurality of positions to exclude progressively said braking resistance from said braking circuit, a voltage coil for said relay responsive to the voltage drop across said braking resistance, an inductive shunt for said current coil, a calibrating resistance normally connected in series circuit relation with said voltage coil, driving means for said controller arranged to be energized by operation of said relay, means operable by said controller when it occupies a predetermined number of its initial positions for short circuiting said current coil and for short circuiting a predetermined amount of said calibrating resistance whereby the advance of said controller through said initial positions is under the control of said voltage coil, said means interrupting said short circuit of said current coil when said controller occupies a predetermined number of its intermediate positions, said means remaining effective to connect said inductive shunt in parallel circuit relation with said current coil whereby the advance of said controller through said intermediate position is under the joint control of said voltage and current coils, said means when said controller is operating through the remainder of its positions rendering said voltage coil ineffective and disconnecting said shunt from said current coil whereby said braking effort is determined solely by said motor current, and means operative during said intermediate positions for increasing the resistance connected in circuit with said voltage coil to compensate partially for the addition of said current coil.

MARCEL J. P. ROYER.